United States Patent
Hsu et al.

(10) Patent No.: US 11,238,365 B2
(45) Date of Patent: Feb. 1, 2022

(54) METHOD AND SYSTEM FOR DETECTING ANOMALIES IN DATA LABELS

(71) Applicant: Oath Inc., New York, NY (US)

(72) Inventors: Francis Hsu, Santa Clara, CA (US); Mridul Jain, Sunnyvale, CA (US); Saurabh Tewari, Sunnyvale, CA (US)

(73) Assignee: VERIZON MEDIA INC., New York, NY (US)

( * ) Notice: Subject to any disclaimer, the term of this patent is extended or adjusted under 35 U.S.C. 154(b) by 1038 days.

(21) Appl. No.: 15/858,001

(22) Filed: Dec. 29, 2017

(65) Prior Publication Data
US 2019/0205794 A1   Jul. 4, 2019

(51) Int. Cl.
*G06N 20/00* (2019.01)
*G06N 5/02* (2006.01)
*G06F 16/28* (2019.01)

(52) U.S. Cl.
CPC ........... *G06N 20/00* (2019.01); *G06F 16/285* (2019.01); *G06N 5/022* (2013.01)

(58) Field of Classification Search
CPC ........ G06N 20/00; G06N 5/022; G06N 5/003; G06N 20/20; G06F 16/285
See application file for complete search history.

(56) References Cited

U.S. PATENT DOCUMENTS

| | | | |
|---|---|---|---|
| 2011/0246937 A1* | 10/2011 | Roberts | G11B 27/34 715/810 |
| 2015/0332157 A1* | 11/2015 | Baughman | G06N 20/00 706/52 |
| 2019/0130308 A1* | 5/2019 | Chickering | G06N 20/00 |
| 2020/0134331 A1* | 4/2020 | Poddar | G06K 9/00812 |
| 2021/0255363 A1* | 8/2021 | Liu | G06N 3/0454 |

* cited by examiner

*Primary Examiner* — Daniel Samwel
(74) *Attorney, Agent, or Firm* — Venable LLP

(57) ABSTRACT

The present teaching relates to a method and system for validating labels of training data. A first group of data records associated with the training data are received, wherein each of the first group of data records includes a vector having at least one feature and a first label. For each of the first group of data records, a second label is determined based on the at least one feature in accordance with a first model. Thereafter, a loss based on the first label associated with the data record and the second label is obtained, and the data record having an incorrect first label is classified when the loss meets a pre-determined criterion. Upon classifying the data records, a sub-group of the first group of data records is generated, wherein each of the data records included in the sub-group has the incorrect first label.

20 Claims, 16 Drawing Sheets

METHOD AND SYSTEM FOR DETECTING ANOMALIES IN DATA LABELS

BACKGROUND

1. Technical Field

The present teaching generally relates to the field of machine learning. Specifically, the present teaching relates to a framework for detecting and correcting anomalies in training records that are used, for instance, in supervised machine learning techniques.

2. Technical Background

A common obstacle preventing the rapid deployment of supervised machine learning algorithms is the lack of reliable labeled training data. Generally, for machine learning and supervised statistical techniques, the quality of the labels in the training data largely determines the performance of the machine learning model. Typically, it is difficult to obtain clean labeled data, unless the data is manually curated. However, for large datasets that are used in training modern machine learning models, e.g., deep neural networks, the training data may be affected by label noise. Such a problem occurs as manual expert-labelling of each instance at a large scale is not feasible.

To overcome the above stated problem, machine learning systems rely on heuristic algorithms to obtain labeled training data. However, the employed heuristic algorithms may be error-prone, and thus in turn may introduce incorrect labels in the training set. Moreover, in Big-Data applications, it is often extremely difficult to decipher which labels in the training data set are potentially incorrect, let alone correct the labeled data.

Accordingly, there is a requirement for developing a framework that detects training records which are potentially mislabeled. Moreover, there is a need for correcting such mislabeled training records and identifying inconsistencies for example, with the heuristic algorithms that are used to label the training records. The present teaching aims to address these issues.

SUMMARY

The teachings disclosed herein relate to methods, systems, and programming for identifying incorrect labels of training data used in machine learning systems. More particularly, the present teaching relates to methods, systems, and programming related to validation of labels of training data.

One aspect of the present disclosure provides for a method, implemented on a machine having at least one processor, storage, and a communication platform capable of connecting to a network for validating labels of training data. The method can be implemented by a label validation system and includes the following steps: receiving a first group of data records associated with the training data, wherein each of the first group of data records includes a vector having at least one feature and a first label. For each of the first group of data records, the method determines a second label based on the at least one feature in accordance with a first model. Thereafter, the method obtains a loss based on the first label associated with the data record and the second label, and classifies the data record as having an incorrect first label when the loss meets a pre-determined criterion. Upon classifying the data records, the method generates a sub-group of the first group of data records, wherein each of the data records included in the sub-group has the incorrect first label.

By one aspect of the present disclosure, there is provided a system for validating labels of training data. The system comprises at least one processor that is configured to receive a first group of data records associated with the training data, wherein each of the first group of data records includes a vector having at least one feature and a first label. For each of the first group of data records, the at least one processor determines a second label based on the at least one feature in accordance with a first model, obtains a loss based on the first label associated with the data record and the second label, and classifies the data record as having an incorrect first label when the loss meets a pre-determined criterion. The at least one processor further generates a sub-group of the first group of data records, wherein each of the data record included in the sub-group has the incorrect first label.

Other concepts relate to software for implementing the present teaching on validating labels of training data. A software product, in accord with this concept, includes at least one machine-readable non-transitory medium and information carried by the medium. The information carried by the medium may be executable program code data, and/or parameters in association with the executable program code.

In one example, a machine-readable, non-transitory and tangible medium having data recorded thereon for validating labels of training data, wherein the medium, when read by the machine, causes the machine to perform a method including a series of steps: receiving a first group of data records associated with the training data, wherein each of the first group of data records includes a vector having at least one feature and a first label. For each of the first group of data records, the method includes determining a second label based on the at least one feature in accordance with a first model, obtaining a loss based on the first label associated with the data record and the second label, and classifying the data record as having an incorrect first label when the loss meets a pre-determined criterion. Further, the method includes generating a sub-group of the first group of data records, each of which has the incorrect first label.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Labeled data used in machine learning systems typically have an error in the assigned labels of the training data. Such errors introduce further errors in the machine learning models. As such the performance of the machine learning model is greatly affected by errors in the assigned labels of the training data. As such obtaining accurate labels or identifying training data that may pose problems in a data processing pipeline is of crucial importance. However, obtaining accurate labels in a Big-Data scenario is challenging, as manual review or other techniques such as representative sampling are infeasible. As such, aspects of the present disclosure provide for techniques of validating incorrectly labeled training data, and provide for correction processes that can enhance the performance of machine learning systems.

Figure 1A:
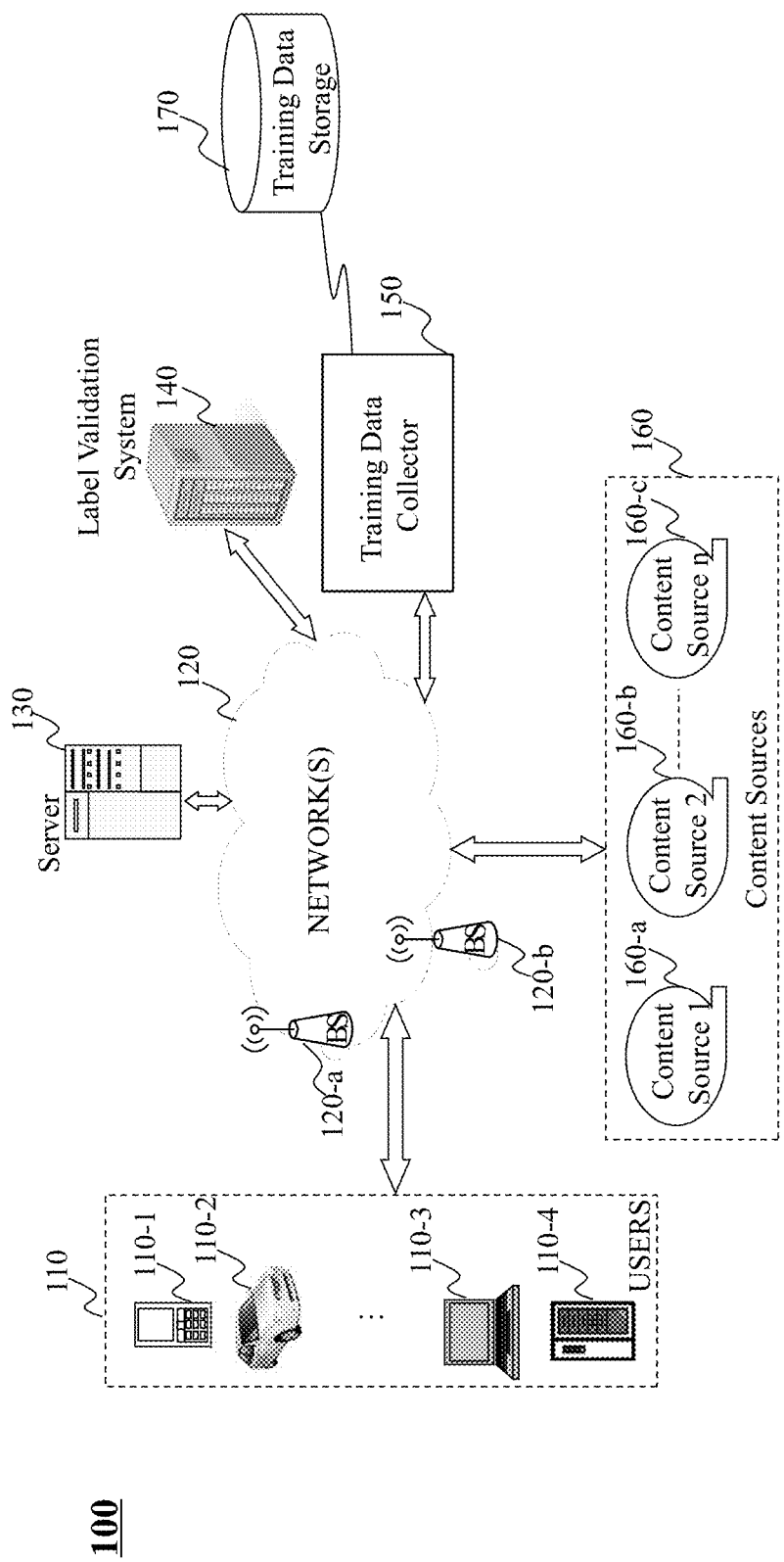
FIGS. 1A-1B illustrate exemplary system configurations in which a label validation server can be deployed in accordance with various embodiments of the present teaching.
Figure 1B:
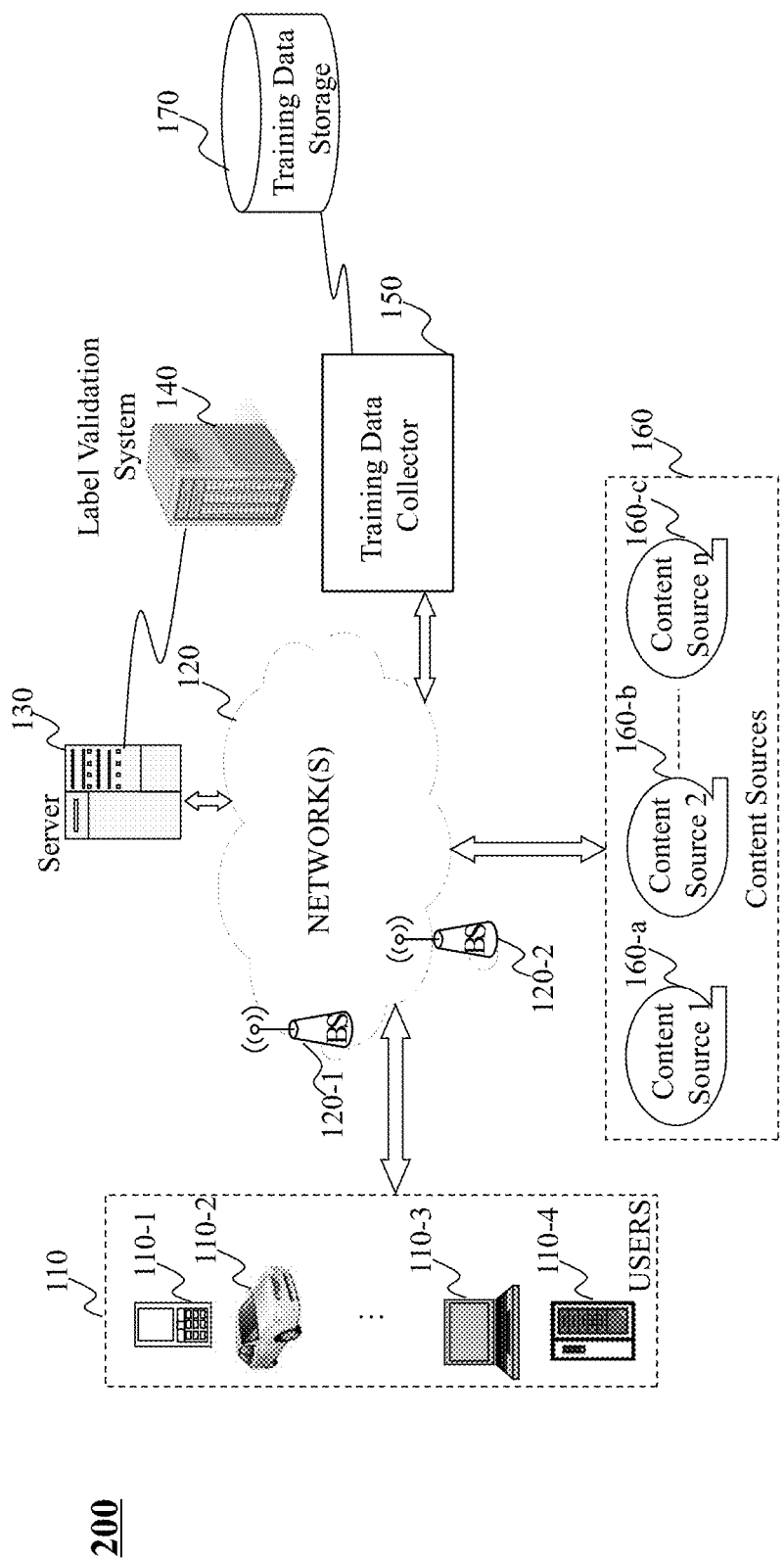

FIGS. 1A-1B illustrate exemplary system configurations in which a label validation system 140 can be deployed in accordance with various embodiments of the present teaching. In FIG. 1A, the exemplary system 100 includes users 110, a network 120, one or more servers 130 (e.g., a login server), content sources 160 including content source 1 160-a, content source 2 160-b . . . content source n 160-c, a label validation system 140, a training data collector 150, and a training data storage 170. By one embodiment, in such a setting as depicted in FIG. 1A, the users 110 may provide login information (from their respective devices) to the server 130 to access content that is provided by the content sources 160.

The network 120 may be a single network or a combination of different networks. For example, a network may be a local area network (LAN), a wide area network (WAN), a public network, a private network, a proprietary network, a Public Telephone Switched Network (PTSN), the Internet, a wireless network, a cellular network, a virtual network, or any combination thereof. A network may also include various network access points, e.g., wired or wireless access points such as base stations or Internet exchange points 120-a, . . . , 120-b, through which a data source may connect to the network 120 in order to transmit information via the network and a network node may connect to the network 120 in order to receive information.

In one embodiment, the network 120 may be an online content network, which connects the label validation system 140 to the one or more servers 130 such as the login server. The label validation system 140 may be configured to validate a label that is associated with an input request (e.g., login request) issued by the user and transmitted to the server 130. Such a validation process may be important to determine whether the user who is trying to access content via the network 120 is a legitimate user or an attacker (i.e., a fraudulent user).

By one embodiment, the label validation system 140 may employ machine learning and/or supervised statistical techniques to train a validation model to detect incorrect labels associated with user's request. As described next with reference to FIG. 2A, each user request (e.g. the login request) is associated with a set of features (i.e., attributes), which constitutes a feature vector. The set of attributes may include a user ID, a location parameter, an IP address of the device being operated by the user to issue the login request, an ISP provider of the user, and the like. Such a feature vector can uniquely identify a particular user. By one embodiment, and as described later with reference to FIG. 2B, a heuristic algorithm can be employed to append a label to the feature vector in order to generate labeled data (also referred to herein as a labeled record). Specifically, the labeled record includes the label (computed by the heuristic algorithm) appended to the feature vector.

By one embodiment, a plurality of labeled data records are collected by the training data collector 150 and stored in the training data storage unit 170. The collected labeled data records are utilized by the label validation system 140 to train a validation model in determining whether a particular label associated with a user's request is valid or not. Such a validation process provides the advantageous ability of determining, for instance, in real-time, whether a new user who has issued a login request to the server 130 is a legitimate user or a fraudulent user.

Users 110 may be of different types such as users connected to the network via desktop connections (110-4), users connecting to the network 120 via wireless connections such as through a laptop (110-3), a handheld device (110-1), or a built-in device in a mobile vehicle such as a motor vehicle (110-2). In one embodiment, user(s) 110 may be connected to the network 120 and able to access and interact with online content such as ads, via wired or wireless means, through related operating systems and/or interfaces implemented within user-wearable devices (e.g., glasses, wrist watch, etc.). A user, e.g., 110-1, may send a request e.g. a login request to the login server 130, and upon being successfully validated by the label validation server 140, receive content via network 120.

The content sources 160 may correspond to an online content/app generator, including a publisher (e.g., CNN-.com), whether an individual, a business, or a content collection agency such as Twitter, Facebook, or blogs. Content sources 110 may be any source of online content such as online news, published papers, blogs, on-line tabloids, magazines, audio content, image content, and video content. It may also be a content portal presenting content originated from a content provider and examples of such content portals include Yahoo! Finance, Yahoo! Sports, AOL, and ESPN. The content from content sources 160 include multi-media content or text or any other form of content comprised of website content, social media content, such as Facebook, Twitter, Reddit, etc., or any other content originator. It may be licensed content from providers such as AP and Reuters. It may also be content crawled and indexed from various sources on the Internet.

FIG. 1A shows a system configuration in which the label validation system 140 serves as an independent service in relation to the server 130. In this configuration, the label validation system 140 can be connected to a plurality of content providers and facilitate content distribution to any user that requests the content, upon successfully validating the user. FIG. 1B presents a slightly different system configuration in which the label validation system 140 is directly coupled to the server 130 as a backend sub-system.

In what follows, there is first provided a description regarding the generation of the labeled data, followed by a detailed description of a machine learning model, according to various embodiments of the present disclosure, that is employed in the label validation system 140 to perform the process of validating labels. For sake of convenience, specific examples in the present disclosure are presented with respect to a login classifier, wherein the feature vector is associated with a login request issued by a user. However, it must be appreciated that the techniques of the various embodiments described herein are equally applicable to any machine learning framework. Further, the terms 'training data', 'labeled training data' and 'training data record' are used interchangeably to imply a data record which comprises a feature vector with a label appended thereto, which is used for training the machine learning model.

Figure 2A:
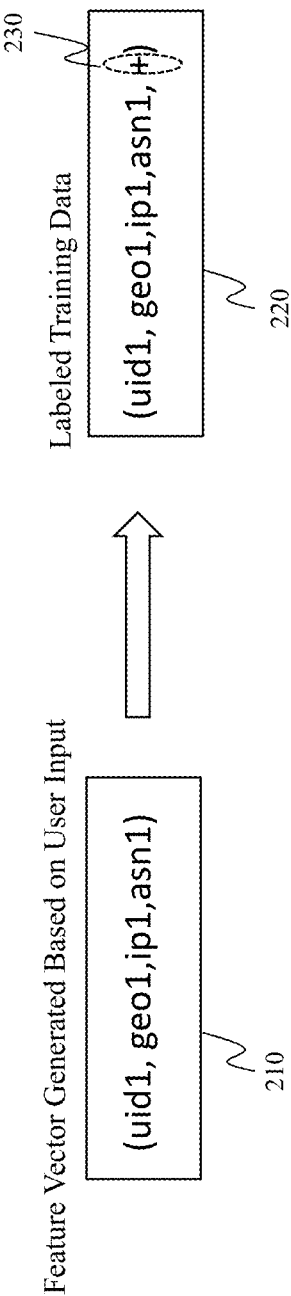
FIG. 2A illustrates an exemplary feature vector and a labeled training data, according to various embodiments of the present teaching.

FIG. 2A illustrates an exemplary feature vector and a labeled training data, according to various embodiments of the present teaching. The feature vector 210 may be generated based on a user input. For example, when a user issues a login request to the server 130, the feature vector 210 can be generated based on the user's request. Parameters such as a user ID (uid1), location (geo1), IP address of the device used by the user to issue the request (ip1), and an ISP provider of the user (asn1) may be extracted from the user's request to generate the feature vector 210.

Further, the feature vector 210 may be input to a labeling unit (described next with reference to FIG. 2B) that determines a label 230 that is to be associated with the feature vector 210. As shown in FIG. 2A, the labeled training data 220 can be generated by appending the label 230 determined by the labeling unit to the feature vector 210. In such a manner, the labeled training data 220 can be generated.

Figure 2B:
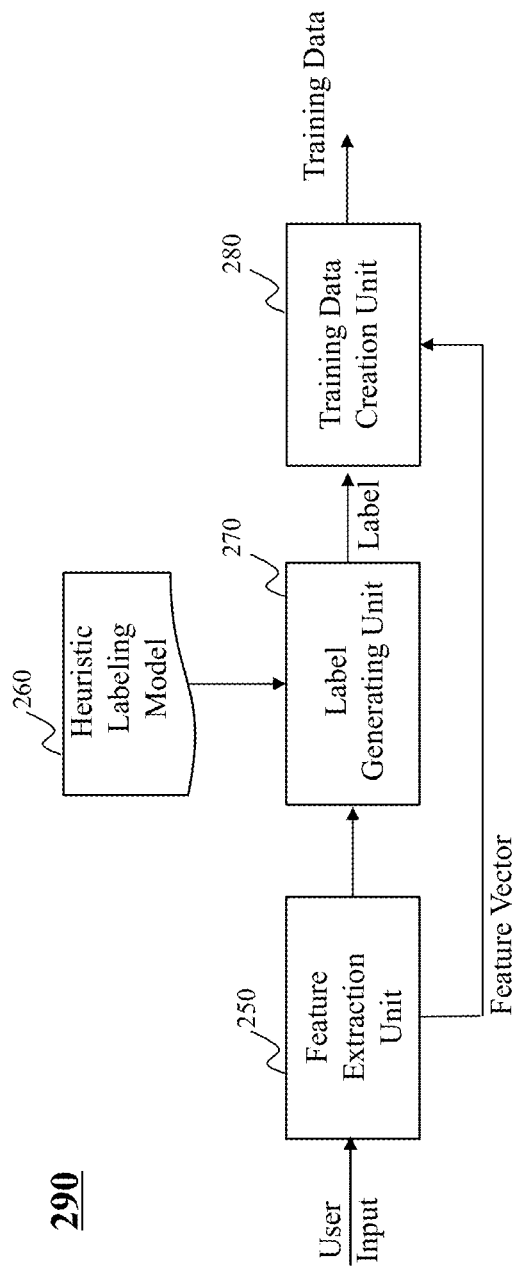
FIG. 2B illustrates an exemplary block diagram depicting generation of labeled training data, according to various embodiments of the present teaching.

FIG. 2B depicts an exemplary block diagram of a training data generator 290, according to an embodiment of the present teaching. The training data generator 290 includes a feature extraction unit 250, a label generating unit 270, a heuristic labeling model 260, and a training data creation unit 280.

The feature extraction unit 250 receives as input a user's request such as a user's login request. Based on the received input, the feature extraction unit extracts parameters such as the user ID, location, IP address of the device used by the user to issue the request, and the ISP provider of the user, and further generates the feature vector e.g., feature vector 210 as depicted in FIG. 2A. The generated feature vector 210 is input to the label generating unit 270. The label generating unit 270 generates a label that is to be associated with the feature vector based on the heuristic labeling model 260. Specifically, based on the parameters included in the feature vector, the heuristic labeling model 260 can be configured to generate a label for the feature vector.

The label generated by the label generating unit 270 is input to the training data creation unit 280. The training data creation unit 280 receives as inputs, the generated label (from the label generating unit 270) and the feature vector (from the feature extraction unit 250). By one embodiment, the training data creation unit 280 is configured to append the label to the feature vector in order to generate labeled training data (i.e., a training record). As described next with reference to FIG. 3, a plurality of such training records are utilized for training a validation model in detecting an anomaly with the label.

Figure 3:
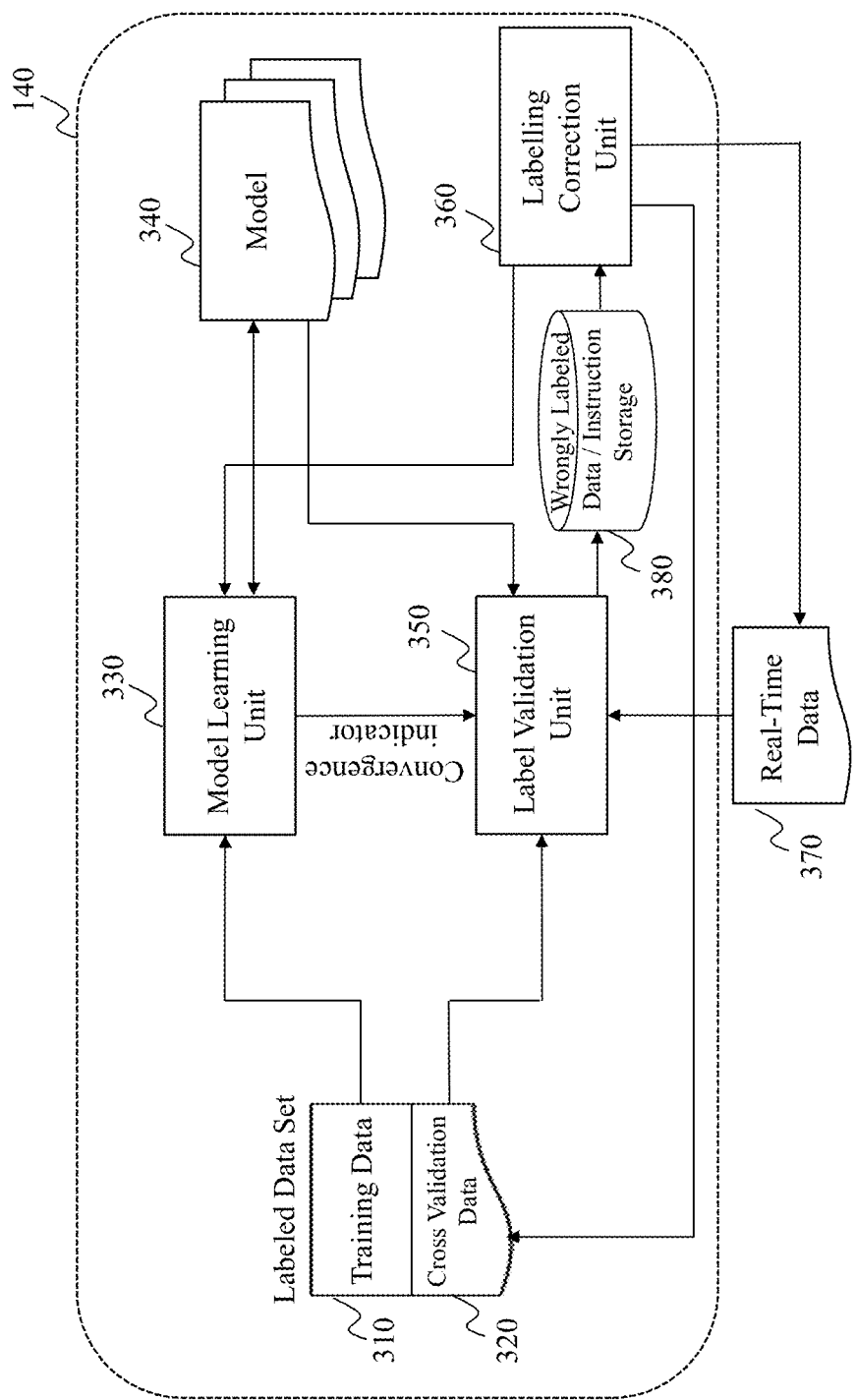
FIG. 3 depicts an exemplary label validation system, in accordance with various embodiments of the present teaching.

FIG. 3 depicts an exemplary label validation system 140, in accordance with various embodiments of the present teaching.

The label validation system 140 includes a labeled data set comprising training data records 310 and cross-validation data records 320, a model learning unit 330, a model 340 (also referred to herein as a machine learning model), a label validation unit 350, a storage 380 configured to store the wrongly labeled data records and an associated instruction with each of the wrongly labeled data records, a labelling correction unit 360.

By one embodiment, training data records 310 are used to train the model learning unit 330, and a portion of the training data records (depicted in FIG. 3 as the cross-validation data records 320) are used for the purpose of validating labels. The training data records are input to the model learning unit 330, wherein the model learning unit is trained until the machine learning model 340 has converged. By one embodiment, the model learning unit 330 can be trained until a convergence criterion is satisfied. For instance, the convergence criterion may correspond to a predetermined number of training data records being used to train the model learning unit 330, and/or a loss associated with the training data records being within a predetermined loss threshold (described later). Details regarding the training of the model learning unit 330 are described with reference to FIG. 5.

When the model 340 converges, the machine learning unit 330 indicates the convergence of the model 340 to the label validation unit 350. The label validation unit 350 receives the cross-validation data records 320, and performs a validation process on each received cross-validation data record. Specifically, the label validation unit 350 determines whether a first label which is determined for instance, by the heuristic labelling model 260 of FIG. 2B, and associated with the cross-validation data record matches a predicted label (i.e., a second label) that is obtained by a prediction of the converged model 340. Note that the machine learning model 340 is configured to predict the second label based on the feature vector associated with the cross-validation data record.

By one embodiment, the label validation unit 350 is configured to compute a loss (e.g., a log-loss) associated with the cross-validation data record. Specifically, the label validation unit 350 is configured to determine a loss between the first label and the predicted second label. It must be appreciated that a high value of the loss is indicative that the cross-validation data record 320 may have been assigned an incorrect first label.

Thus, by one aspect of the present disclosure, the label validation unit 350 may be further configured to classify the cross-validation data records as having an incorrect first label when the loss satisfies a pre-determined criterion (e.g., the loss is above a certain predetermined loss threshold value). Thus, as shown in FIG. 3, the label validation unit 350 may store all the wrongly labeled data records in a storage unit 380. As described later with reference to FIG. 7A, each of the wrongly labeled cross-validation data record is also associated with a correction instruction that is directed to perform a further correction process.

The set of wrongly labeled data records are input to the label correction unit 360, which is configured by one embodiment to correct the wrongly labeled cross-validation data records. For instance, as shown in FIG. 3, the label correction unit 360 may be configured to change (i.e., replace) the first label (determined by the heuristic model) with the second label that is predicted by the converged machine learning model 340. Details regarding the above stated correction processes are described later in detail with reference to FIGS. 7A and 9A.

By one embodiment, the label correction unit 360 may also be configured to provide an indication to the model learning unit 330 to restart the training phase by considering a new set of training data records. Such an indication may be provided by the label correction unit 360 upon determining, for instance, that in the label validation process, the labels of all the cross-validation data records were determined to be incorrectly labeled by the heuristic model.

Moreover, by one embodiment, upon training the model learning unit 330 and validating the cross-validation data records 320, the label validation system 140 may be configured to receive additional data such as testing data records, real-time production data records, to determine performance of the converged machine learning model 340, as well as to validate the labels associated with the additional data records. The processing of such additional data records may be used to determine a performance measure of the label validation system 140. Note that the label validation system 140 may also be configured to perform the correction process, e.g., modifying the first label associated with the additional data records.

Figure 4:
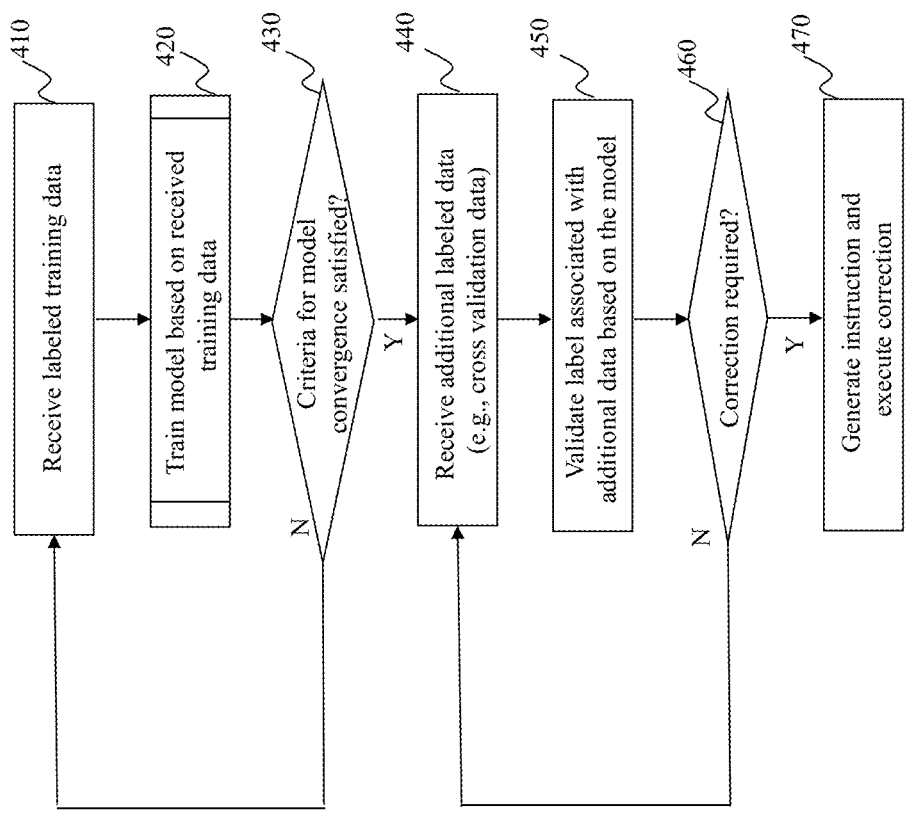
FIG. 4 depicts an illustrative flowchart of an exemplary process performed by the label validation system, in accordance with an embodiment of the present teaching.

FIG. 4 depicts an illustrative flowchart of an exemplary process performed by the label validation system 140, in accordance with an embodiment of the present teaching.

The process as depicted in FIG. 4 includes a machine learning model training phase and a label validation phase. As stated previously, labeled training data is used for training the machine learning model, and a portion of the labeled training data (referred to herein as cross-validation labeled data) is used for label validation purposes.

The model training phase commences in step 410, wherein the label validation system 140 receives a labeled training data record. Note that the training data record includes a feature vector (i.e., a vector having at least one feature) and a first label. An exemplary training data record is depicted in FIG. 2A. Further, the first label associated with the training data record may be generated by the heuristic labeling model 260 as shown in FIG. 2B.

The process then moves to step 420, wherein the label validation system trains the machine learning model with the training data record. Details regarding the training of the model are described next with reference to FIG. 5 and FIG. 6.

Upon training the model in step 420, the process moves to step 430 and performs a query to determine whether a criterion associated with model convergence is satisfied. Specifically, the process performs a query to determine whether the model undergoing training has converged (i.e., the model has achieved a steady state). By one embodiment, the criterion associated with the model convergence may correspond to determining whether a predetermined number of training records have been utilized in training the model. Additionally, another criterion associated with model convergence may correspond to determining whether a loss associated with the training records is within a predetermined threshold (e.g., loss is lower than 1%, loss is zero, etc.).

If the response to the query is negative, the process loops back to step 410 and repeats the model training phase by considering the next training data record. However, if the response to the query of step 430 is affirmative, the process moves to step 440 to commence the label validation phase.

By one embodiment, in step 440, the label validation system receives additional labeled data records whose respective first labels are to be validated. Note, as stated previously, the received additional labeled data records may correspond to a portion of the training data records that are used for validation purposes (e.g., the cross-validation data records).

The process then moves to step 450, wherein the first label of the additional labeled data record under consideration is validated based on the converged model obtained after the model training phase. Details regarding the validation process of the data record are described later with references to FIG. 7A and FIG. 7B.

Based on a result of the validation, the process in step 460 performs a query to determine whether a correction of the first label of the cross-validation data record is to be performed. If the response to the query is negative, the process loops back to step 440 to validate the next cross-validation data record. However, if the response to the query in step 460 is affirmative, the process moves to step 470, wherein an instruction is generated to execute the correction of the cross-validation data record. Details regarding the correction of the cross-validation data record are described later with reference to FIG. 9B.

Figure 5:
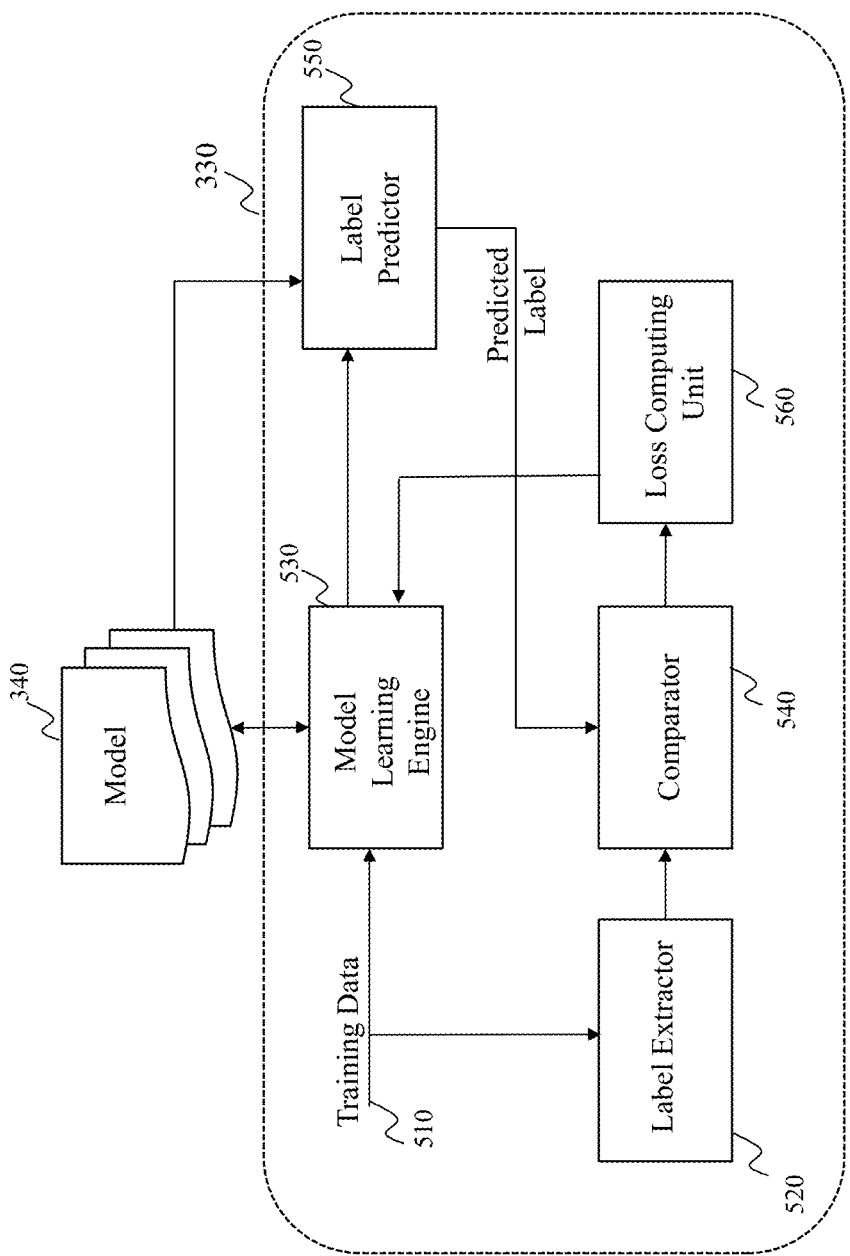
FIG. 5 depicts an exemplary model learning unit included in the label validation system, in accordance with various embodiments of the present teaching.

FIG. 5 depicts an exemplary model learning unit 330 included in the label validation system 140, in accordance with various embodiments of the present teaching.

The model learning unit 330 includes a model learning engine 530, a label predictor 550, a label extractor 520, a comparator 540, and a loss computing unit 560. Training data records 510 are input to the model learning engine 530. Note that each training record includes a feature vector and a label (e.g., a first label determined by the heuristic labelling model 260).

The model learning engine 530 utilizes the label predictor 550 to predict a label (e.g., a second label) based on the feature vector of the input training data record and the model 340. Further, the label extractor 520 is configured to extract the first label from the training data record 510 and input the extracted first label to the comparator 540. As shown in FIG. 5, the comparator 540 also receives the predicted label (i.e., the second label) from the label predictor 550.

By one embodiment, the comparator 540 may be configured to compare the extracted first label and the predicted second label to determine whether the second label matches the first label. Upon determining that there is a mismatch between the second label and the first label, the loss computing unit 560 may be configured to compute a log-loss based on the first label associated with the training data record and the second label. The computed loss is back propagated (i.e. fed back) to the machine learning engine 530. Based on the received loss, the machine learning engine 530 is configured to adjust parameters/weights of the model 340 to obtain correct label predictions. By one embodiment, algorithms such as stochastic gradient descent and the like may be utilized to update the model parameters/weights. Note that in cases where the comparator 540 detects a match between the first label and the second label, the model learning unit may skip the step of loss computation and proceed to train the model learning engine with the next training data record.

Moreover, it must be appreciated that the sequence of events as described above with respect to FIG. 5 are in no way limiting the scope of the present disclosure. For instance, by one embodiment, the sequence of events can be modified as follows: upon the label predictor 550 predicting the second label, the loss computing unit 560 can compute a loss between the second label and the first label associated with the training record. A high value of the computed log-loss may serve as an indication about a mismatch between the first label and the second label. Accordingly, only the training records which result in a high log-loss value (e.g. a sudden spike in the value of the log-loss with respect to a predetermined loss threshold) are analyzed further by the comparator. In other words, the comparator may be configured to compare the first label and the second label associated with the training data record only upon a determination of a high log-loss value associated with the training record. For such training records, the log-loss value can be fed-back to the model learning engine 530 for updating the parameters/weights of the model 340 as stated previously. It must be noted that in such a scenario, upon the loss computing unit 560 determining a small (or zero) loss value between the first and the second label, the model learning unit 330 may skip the step of comparing the first label with the second label (via the comparator 540) and proceed to train the model learning engine with the next training data record.

Figure 6:
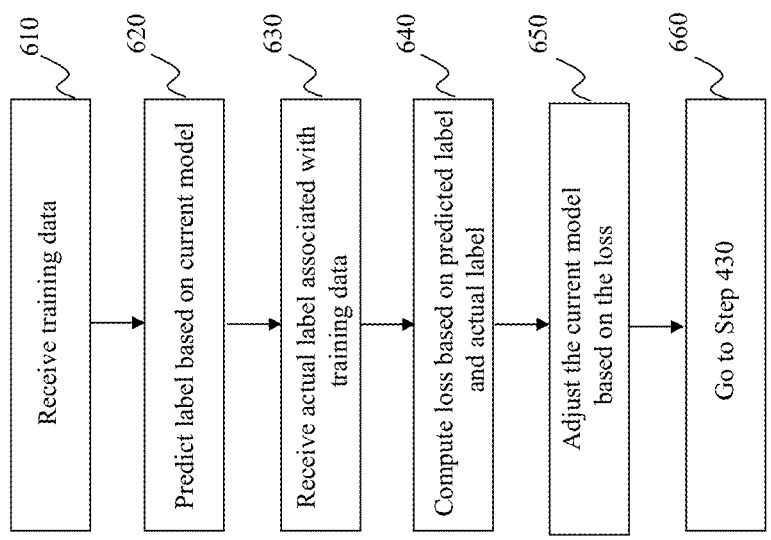
FIG. 6 depicts an illustrative flowchart of an exemplary process performed by the model learning unit, in accordance with various embodiments of the present teaching.

FIG. 6 depicts an illustrative flowchart of an exemplary process performed by the model learning unit 330 of the label validation system 140, in accordance with various embodiments of the present teaching.

The process commences in step 610 wherein the machine learning unit 330 receives training data records. Upon receiving the training data record, the process proceeds to step 620 wherein the machine learning unit predicts a label (referred to herein as a second label) associated with the training record. It must be appreciated that the second label is predicted based on the feature vector of the training record in accordance with a current state of the machine learning model (i.e., a current state of the machine learning model in the training phase).

The process then moves to step 630 wherein a first label associated with the training data record is extracted. Note that the by one embodiment, the first label may be assigned to the training data record based on a heuristic model (e.g., the labelling heuristic model 260 as shown in FIG. 2B).

The process in step 640 computes a loss (e.g. a log-loss) based on the predicted label (i.e., the second label) and the first label associated with the training data record. Based on the computed log-loss value, the process in step 650 may update (i.e. adjust) the current model parameters/weights based on techniques such as stochastic gradient descent and the like.

Upon updating the parameters of the model, the process moves to step 660. As shown in FIG. 6, in step 660, the process loops back to step 430 of FIG. 4 to perform a query to check whether the previously described convergence criteria for the model is satisfied.

Figure 7A:
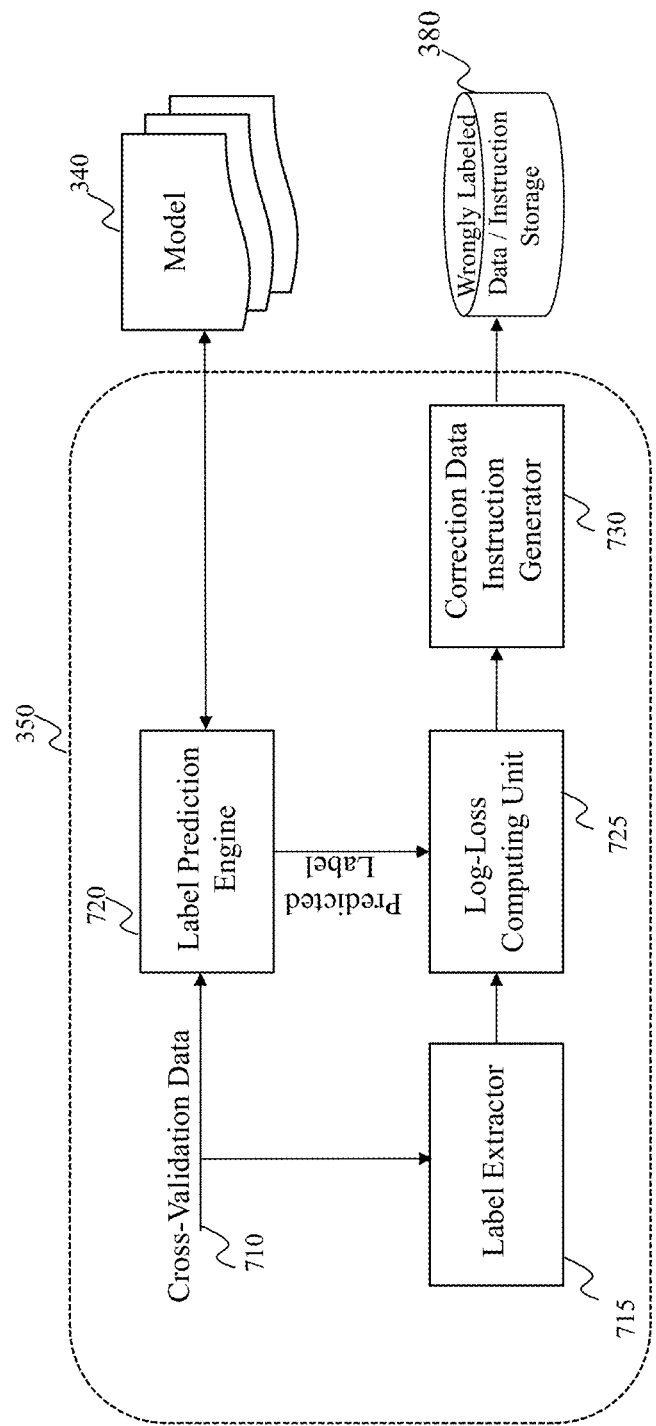
FIG. 7A depicts an exemplary label validation unit included in the label validation system, in accordance with various embodiments of the present teaching.

Turning to FIG. 7A, there is depicted an exemplary label validation unit 350 included in the label validation system 140, in accordance with various embodiments of the present teaching.

The label validation unit 350 includes a label prediction engine 720, a label extractor 715, a log-loss computing unit 725, and a correction data instruction generator 730.

As described previously with reference to FIG. 3, a portion of the training data records (referred to herein as the cross-validation data records 710) are input to the label prediction engine 720 of the label validation unit 350 for the purpose of validating the label (first label) associated with each of the cross-validation data records 710.

The label prediction engine 720 predicts a label (i.e., the second label) based on the feature vector associated with the cross-validation data record in accordance with the model 340. Note that the model 340 at this time instant, is a converged model (i.e., the model 340 is fully trained by the training data records).

The predicted label (second label) and the label associated with the cross-validation data record (first label as determined by the heuristic model) are input to the log loss computing unit 725. By one embodiment, the log-loss computing unit 725 computes a loss based on the first label associated with the cross-validation data record and the second label. Note that a low value of log loss (e.g., a zero log-loss value) indicates that the label predicted by the label prediction engine 720 (i.e., the second label) matches the initially assigned label (i.e., the first label determined by the heuristic model) to the cross-validation data record.

However, a spike in the value of the computed log-loss (e.g., a high value of the log-loss) indicates that the label predicted by the label prediction engine 720 (i.e., the second label) does not match the initially assigned label (i.e., the first label). Accordingly, the label validation unit 350 can be configured to classify the cross-validation data record as having an incorrect first label when the loss satisfies a pre-determined criterion (e.g., a high log-loss value with respect to some predetermined loss threshold).

By one embodiment, the label validation unit 350 may be further configured to generate a group of all the cross-validation data records that have been identified as having an incorrect first label. Further, the label validation unit 350 may be configured to utilize a correction data instruction generator 730 that receives information, for instance, the predicted label (second label), the initial label (first label), and the associated log-loss corresponding to the cross-validation data record that have incorrect first labels, and further generates an instruction directed to a correction process to be executed.

Figure 8:
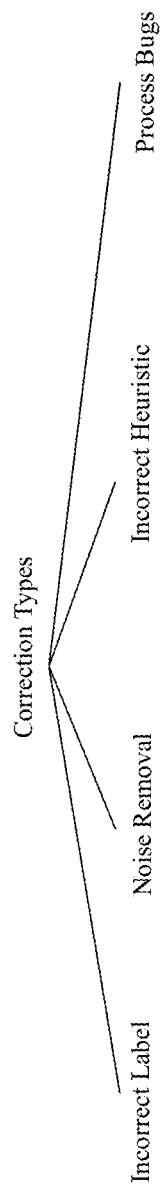
FIG. 8 depicts an illustrative graph depicting various types of corrections, in accordance with various embodiments of the present teaching.

By one embodiment, the correction process (i.e., a type of correction) may correspond to correcting an incorrect heuristic, a noise removal process, correcting a process bug in the generation of labels and the like as depicted in FIG. 8. It must be appreciated that the correction process includes correcting, for each of the cross-validation data records that have been identified as having the incorrect first label (via the log-loss computation), the associated first label based on the corresponding second label. For instance, by one embodiment, the label validation unit may replace the first label with the second label. The wrongly labeled cross-validation data records are stored (along with the respective instructions) in the wrongly labeled data storage unit 380. Further details regarding the correction processes are described later with respect to FIGS. 9A and 9B.

Figure 7B:
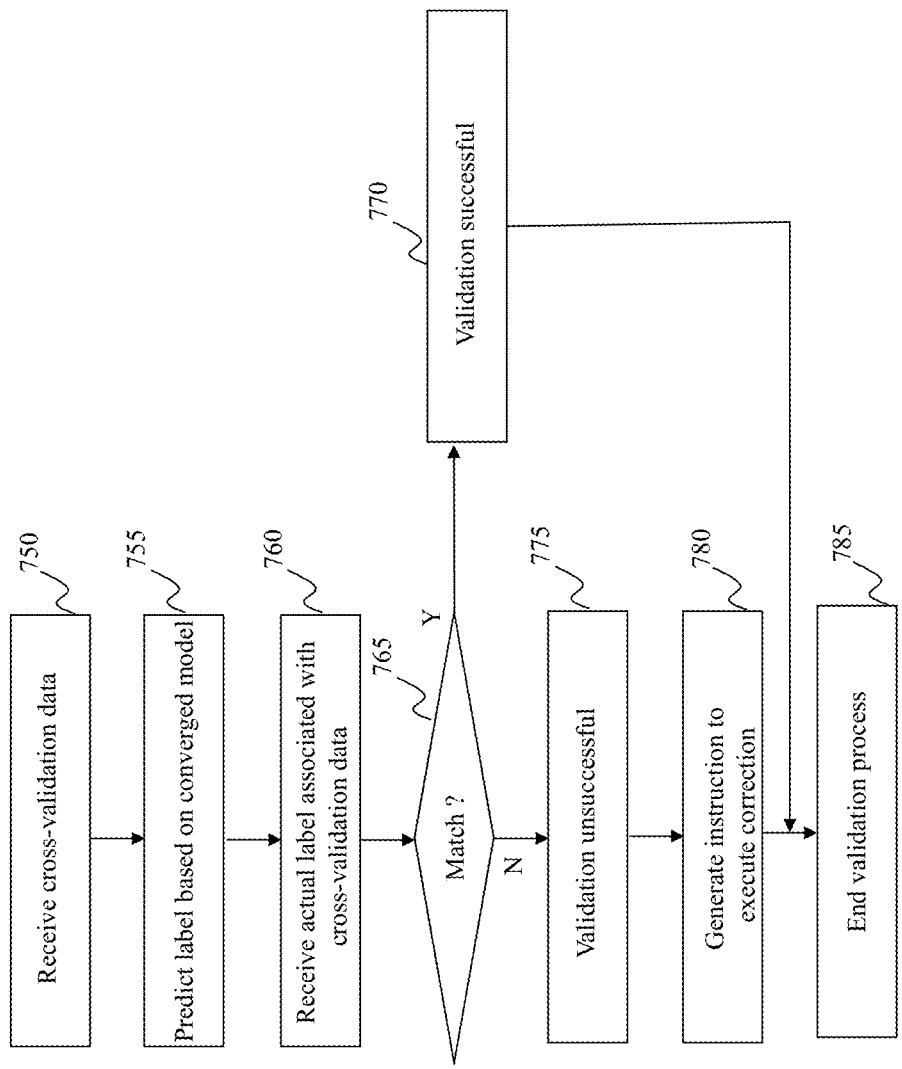
FIG. 7B depicts an illustrative flowchart of an exemplary process performed by the label validation unit, in accordance with various embodiments of the present teaching.

FIG. 7B depicts an illustrative flowchart of an exemplary process performed by the label validation unit 350, in accordance with various embodiments of the present teaching.

The process commences in step 750, wherein the label validation unit 350 receives cross-validation data records. Note that the label validation unit 350 validates the first label associated with each of the cross-validation records as described below.

In step 755, the process predicts a label (i.e., the second label) for each of the cross-validation data record based on the converged model. In step 760, the process proceeds to retrieve the first label associated with each of the cross-validation data record. Note that as stated previously, the first label may be assigned to the cross-validation data record based on a heuristic labeling model (as shown in FIG. 2B).

The process then moves to step 765, wherein a query is made to determine whether the first label associated with the cross-validation data record matches the second label as predicted by the converged model. Note that, as stated previously, a determination of whether the two labels match may be based on the log-loss value that is computed based on the two labels. If the response to the query in step 765 is affirmative, the process moves to step 770, wherein the label validation system determines that the label of the particular cross-validation data record under consideration is valid, where after the process terminates.

However, if the response to the query in step 765 is negative (i.e., the first label does not match the second predicted label), the process moves to step 775, wherein the label validation unit determines that the validation of the first label associated with the cross-validation data record was unsuccessful. Thereafter, the process moves to step 780, wherein the label validation unit generates an instruction to perform a correction process. Details regarding the correction process are described next with reference to FIGS. 9A and 9B. Upon generating the correction instructions for all cross-validation data records that have been incorrectly labeled (e.g., by the heuristic labeling model), the validation process as shown in FIG. 7B terminates.

Figure 9A:
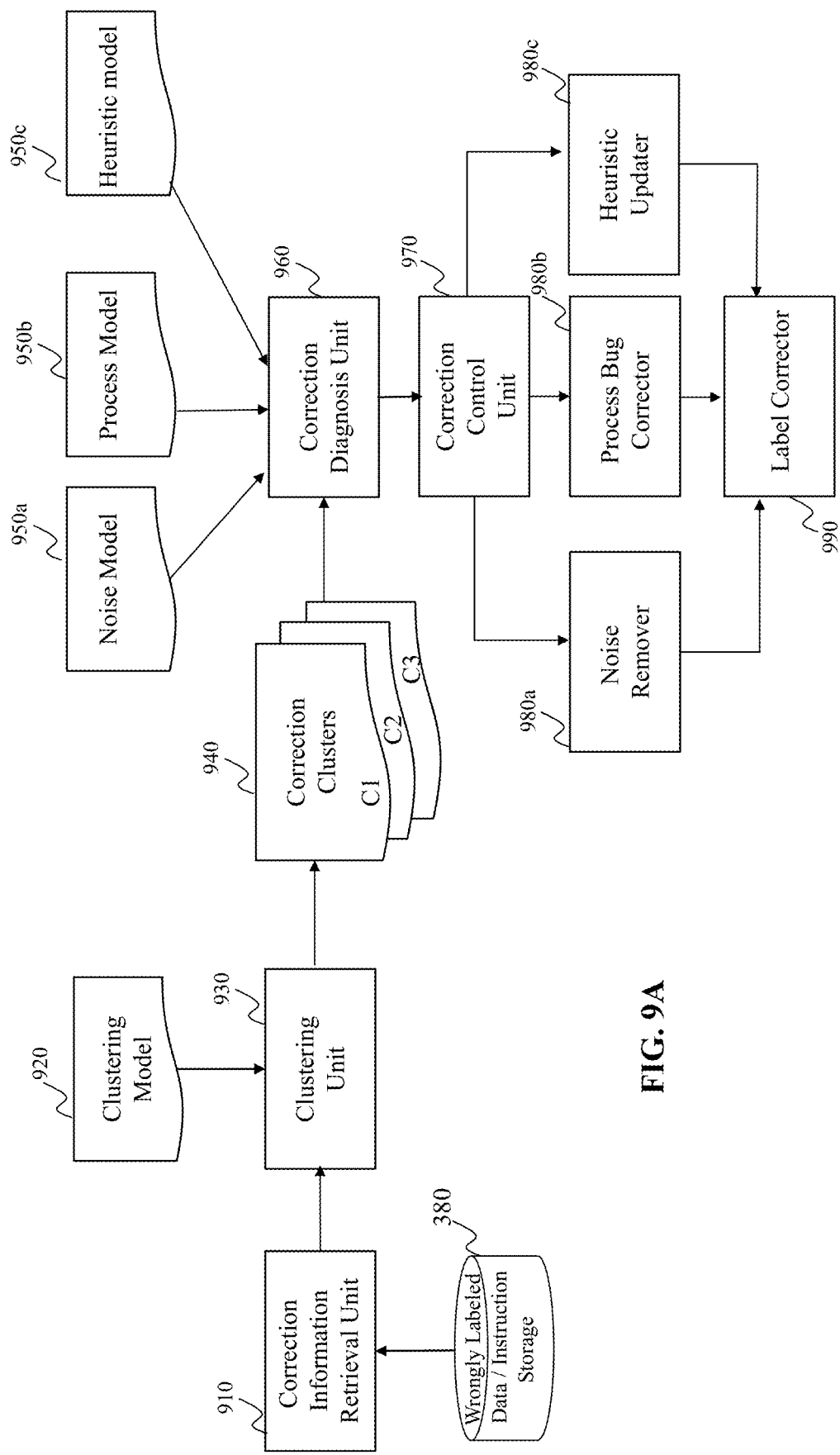
FIG. 9A depicts an exemplary label correction unit, in accordance with an embodiment of the present teaching.

FIG. 9A depicts an exemplary label correction unit 360, in accordance with an embodiment of the present teaching.

The label correction unit includes a correction information retrieval unit 910, a clustering unit 930, a clustering model 920, correction clusters 940, a correction diagnosis unit 960 that utilizes a plurality of models such as a noise model 950a, a process model 950b, and a heuristic model 950c, a correction control unit 970, a noise remover 980a, a process bug corrector 980b, a heuristic updater 980c, and a label corrector 990.

Figure 10:
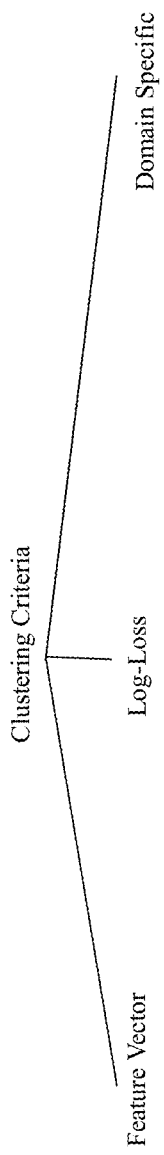
FIG. 10 depicts an illustrative graph depicting different criteria for clustering wrongly labeled data records, in accordance with various embodiments of the present teaching.

By one embodiment, the correction information retrieval unit 910 receives the set of data records that have been wrongly labeled from the wrongly labeled data storage unit 380. Upon receiving the wrongly labeled data records, the label correction unit 360 utilizes the clustering unit 930 to generate at least one cluster of the wrongly labeled data records. The clustering unit 930 is configured to generate the clusters based on a clustering model 920. For instance, by one embodiment, unsupervised clustering mechanisms can be utilized to form the clusters. The clusters can be generated based on a predetermined criteria such as the log-loss values, the features associated with the data records, or domain specific criteria as shown in FIG. 10.

The clustering unit 930 utilizes at least one criteria to generate the correction clusters 940. The correction clusters 940 are input to the correction diagnostic unit 960 to identify, for each of the one or more clusters, a cause that leads to the first labels associated with the data records (included in the clusters) being incorrect.

By one embodiment, each cluster is sampled to select a set of data records that are further analyzed to identify the cause of the data records being present in the cluster. In what follows, there is provided examples outlining the causes for existence of clusters. For sake of simplicity, a login classifier example is considered. However, the techniques described herein are equally applicable in other machine learning applications. Note that as stated previously, with regard to the login classifier, a user's login request may be associated with a set of features (i.e., attributes), which constitutes the feature vector. The set of attributes may include a user ID, a location parameter, an IP address of the device being operated by the user to issue the login request, an ISP provider, etc.

By one embodiment, the correction diagnosis unit 960 uses the noise model 950a, the process model 950b, and the heuristic model 950c to identify the cause of the cluster as being noise, a bug in a process pipeline of the login classifier, or a defect in the heuristic labeling model. By one embodiment, the cause of the cluster can be attributed to be noise, if the data records included in the cluster do not share a common characteristic or trait. For instance, each data record in the cluster may have unique features (e.g. unique feature vectors) such that a common underlying reason cannot be attributed to the presence of the data records within the cluster. In such an instance, the correction diagnosis unit 960, may utilize the noise model 950a to identify the presence of unique features of each data record in the cluster. Further, the correction control unit 970 can control the noise remover 980a to perform a correction process on the data records within the cluster. For instance, by one embodiment, the correction process for the data records that have been identified to be included in the cluster due to noise, the correction process may include removing such data records from the machine learning system for further analysis.

A further example for the cause of the data records being included in a specific cluster may be defects in the processing pipeline of the login classifier. The data records in a cluster may be analyzed to determine a time instant corresponding to each data record. For instance, in the case of the login classifier, each data record corresponds to a login request initiated by a user at a certain time instant. Accordingly, by one embodiment, the correction diagnosis unit 960 may utilize a process model 950b to identify the time instants corresponding to the data records in the cluster. The correction diagnosis unit 960 may identify that all the data records within a particular cluster have been mislabeled within a certain time period. Accordingly, the cause of existence of such mislabeled data records may be a bug in the processing pipeline of the classifier. Accordingly, a correction process associated with such data records may correspond to the correction control unit 970 initiating the process bug corrector 980b to analyze the processing pipeline at the time instant corresponding to the time at which the data records were wrongly labeled.

By one embodiment of the present disclosure, a correction process (with respect to certain data records included in a cluster) may be an auto-correction process. For instance, consider a certain number of wrongly labeled data records included in a particular cluster. In one instance, the login classifier may issue a challenge to each user corresponding to the wrongly labeled data record. An example of a challenge may include verification of a passcode from the users. In this case, if the correction diagnosis unit 960 receives successful passcode verifications from the user(s), the correction diagnosis unit 960 may determine that all the labels corresponding to the data records of the users in the specific cluster can be auto-corrected.

By one embodiment, the clusters can be generated based on domain specific heuristics. In this case, the clusters can be tagged (i.e., labeled) as one of heuristic challenged, classifier challenged, low score not challenged, high login failure, etc. the correction diagnosis unit 960 may utilize a heuristic model 950c to identify the cause of the data records being clustered as a defect with the heuristic labeling model (or a defect with a threshold level associated with a parameter of the heuristic model). For instance, if the sampled data records within the cluster that are further analyzed are issued a short-message service (SMS) verification challenge (i.e., a text message challenge) and the correction diagnosis unit 960 receives successful verification from the sampled users, the correction diagnosis unit 960 may activate a heuristic updater to perform a correction process corresponding to modifying or adjusting the threshold of the heuristic labeling model.

Moreover, by one aspect of the present disclosure, the label correction unit 360 upon performing the correction processes as described above may activate a label corrector 990 that is configured to change the wrongly labeled data record. Specifically, the label corrector 990 corrects for each data record, the associated first label (determined by the labeling heuristic model) based on the corresponding second label (i.e., the predicted label). For example, by one aspect of the present disclosure, the label correction unit 360 may replace the first label with the second label.

Figure 9B:
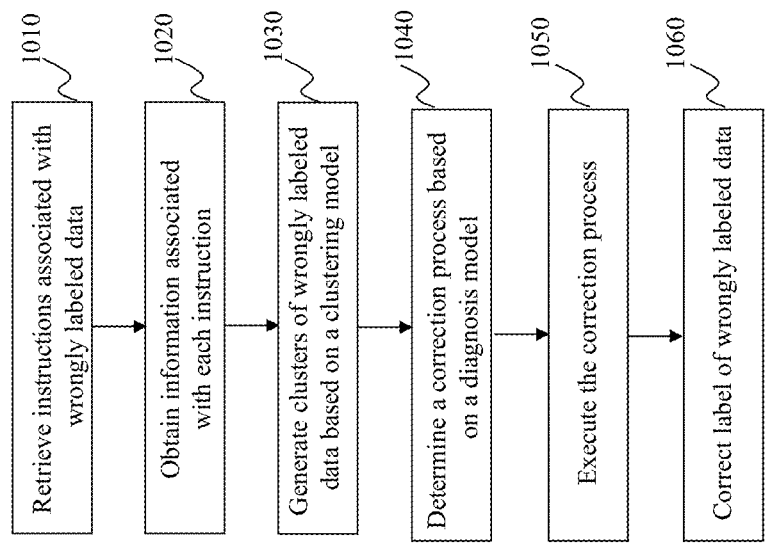
FIG. 9B depicts an illustrative flowchart of an exemplary process performed by the label correction unit, in accordance with an embodiment of the present teaching.

Turning to FIG. 9B, there is depicted an illustrative flowchart of an exemplary process performed by the label correction unit 360, in accordance with an embodiment of the present teaching.

The process commences in step 1010, wherein the label correction unit retrieves instructions associated with wrongly labeled data from the wrongly labeled data storage unit 380. The process further moves to step 1020, wherein the label correction unit obtains information associated with each instruction. For example, the information may include the predicted label, the actual label as determined by the labeling heuristic model, the log-loss value associated with the actual label, etc.

The process then moves to step 1030, wherein the label correction unit generates clusters of the wrongly labeled data records based on a clustering model. For instance, as stated previously with reference to FIG. 9A, the label correction unit utilizes the clustering unit 920 that generates clusters of the wrongly labeled data records based on at least one clustering criteria (as shown in FIG. 10).

Further, the process moves to step 1040, wherein the label correction unit determines a correction process based on a diagnosis model. For example, the label correction unit determines a correction process such as noise removal, heuristic updating, or process bug analyzing as described previously with reference to FIG. 9A.

The process then moves to step 1050, wherein the label correction unit executes the correction process as determined in step 1040. Further, the process in step 1060, corrects the labels of the wrongly labeled data records. For instance, as stated previously, the label corrector corrects for each data record, the associated first label (determined by the labeling heuristic model) based on the corresponding second label (i.e., the predicted label). For example, by one aspect of the present disclosure, the label correction unit 360 may replace the first label with the second label. Upon correcting the labels of the wrongly labeled data records, the process as outlined in FIG. 9B terminates.

Figure 11:
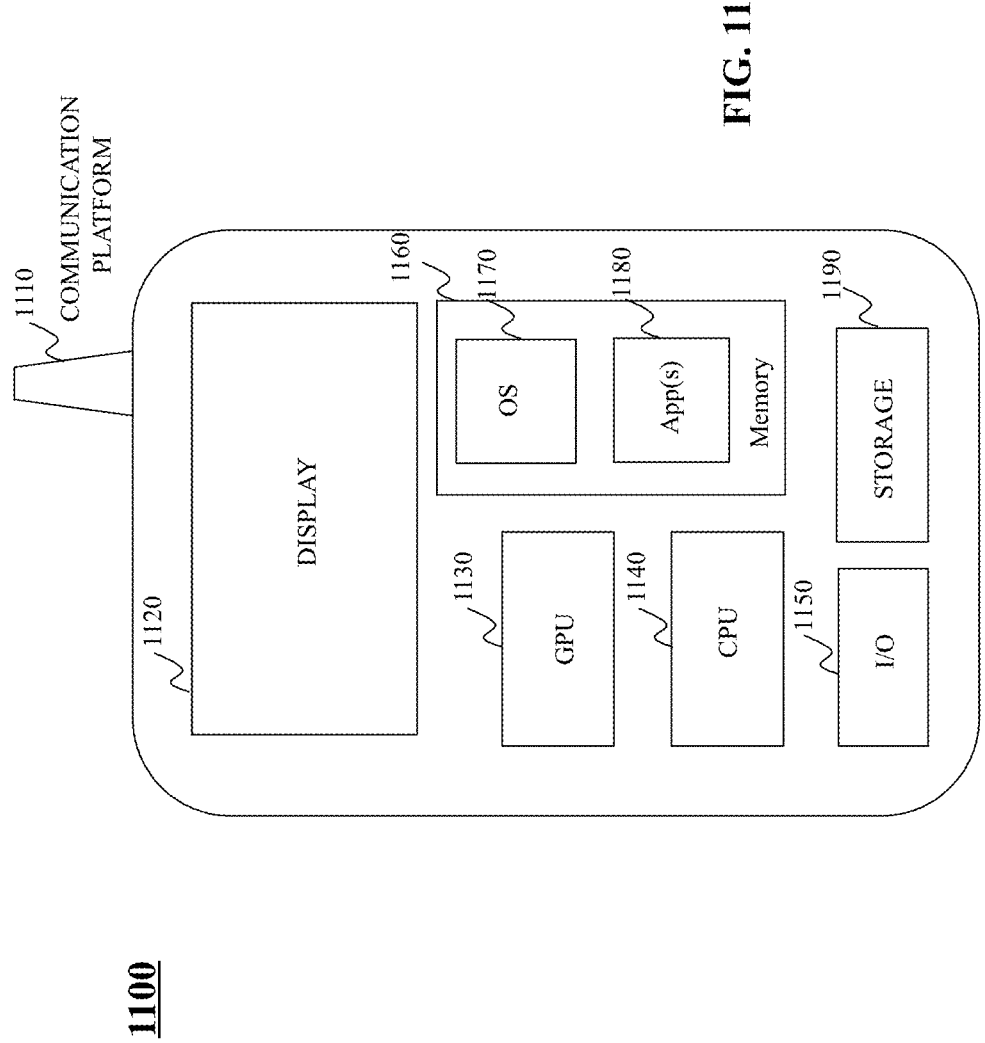
FIG. 11 depicts an architecture of a mobile device which can be used to implement a specialized system incorporating the present teaching.

Turning now to FIG. 11, there is depicted an architecture of a mobile device 1100 which can be used to realize a specialized system implementing the present teaching. In this example, a user device on which the functionalities of the label validation system 140 as described herein can be implemented is a mobile device 1100, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1100 in this example includes one or more central processing units (CPUs) 1140, one or more graphic processing units (GPUs) 1130, a display 1120, a memory 1160, a communication platform 1110, such as a wireless communication module, storage 1190, and one or more input/output (I/O) devices 1150. Any other suitable component, including but not limited to a system bus or a controller (not shown), may also be included in the mobile device 1100. As shown in FIG. 11, a mobile operating system 1170, e.g., iOS, Android, Windows Phone, etc., and one or more applications 1180 may be loaded into the memory 1160 from the storage 1190 in order to be executed by the CPU 1140. The applications 1180 may include a browser or any other suitable mobile apps for performing the various functionalities of the label validation system on the mobile device 1100. User interactions with the content displayed on the display panel 1120 may be achieved via the I/O devices 1150.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to explore label validation functionalities. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 12:
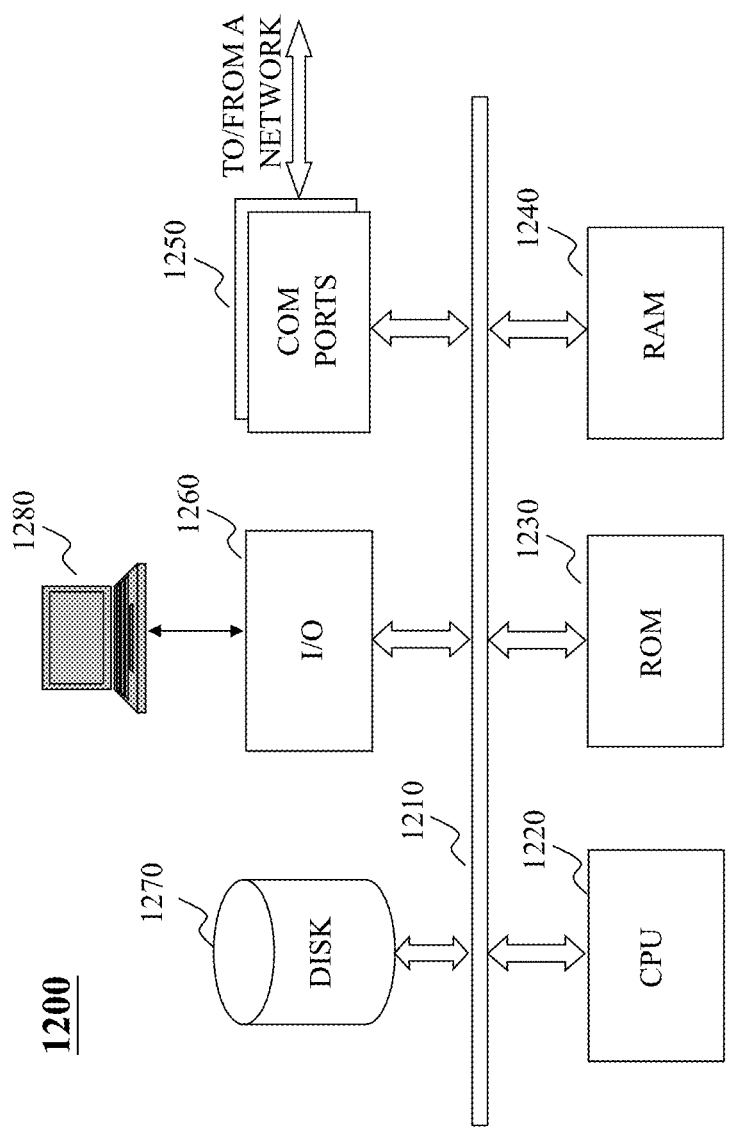
FIG. 12 depicts the architecture of a computer which can be used to implement a specialized system incorporating the present teaching.

FIG. 12 is an illustrative diagram of an exemplary computer system architecture, in accordance with various embodiments of the present teaching. Such a specialized system incorporating the present teaching has a functional block diagram illustration of a hardware platform which includes user interface elements. Computer 1200 may be a general purpose computer or a special purpose computer. Both can be used to implement a specialized system for the present teaching. Computer 1200 may be used to implement any component of the label validation system, as described herein. For example, the label validation system 140 may be implemented on a computer such as computer 1200 via its hardware, software program, firmware, or a combination thereof. Although only one such computer is shown, for convenience, the computer functions relating to label validation systems for detecting anomalies in data labels as described herein may be implemented in a distributed fashion on a number of similar platforms, to distribute the processing load.

Computer 1200, for example, may include communication ports 1250 connected to and from a network connected thereto to facilitate data communications. Computer 1200 also includes a central processing unit (CPU) 1220, in the form of one or more processors, for executing program instructions. The exemplary computer platform may also include an internal communication bus 1210, program storage and data storage of different forms (e.g., disk 1270, read only memory (ROM) 1230, or random access memory (RAM) 1240), for various data files to be processed and/or communicated by computer 1200, as well as possibly program instructions to be executed by CPU 1220. Computer 1200 may also include an I/O component 1260 supporting input/output flows between the computer and other components therein such as user interface elements 1280. Computer 1200 may also receive programming and data via network communications.

Hence, aspects of the methods for validating data labels as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of label validation system into the hardware platform(s) of a computing environment or other system implementing a computing environment or similar functionalities in connection with label validation. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the label validation system, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for validating labels of training data, the method comprising:
   receiving a first group of data records associated with the training data, wherein each of the first group of data records includes a vector having at least one feature and a first label determined via a heuristic model;
   for each of the first group of data records,
      determining a second label based on the at least one feature in accordance with a first model different from the heuristic model and obtained via training based on the data records;
      in the event that the first label does not match the second label, obtaining a loss indicating a degree of mismatch between the first label and the second label; and
      classifying the data record as having an incorrect first label when the loss meets a pre-determined criterion; and
   generating a sub-group of the first group of data records, each of which has the incorrect first label.

2. The method of claim 1, wherein the loss is determined based on a discrepancy between the first label and the second label.

3. The method of claim 1, further comprising:
correcting, for each of the sub-group of data records, the associated first label based on the corresponding second label.

4. The method of claim 1, further comprising:
clustering the sub-group of data records into one or more clusters; and
identifying, with respect to each of the one or more clusters, a cause that leads to the incorrect first labels.

5. The method of claim 4, further comprising:
determining, for at least some cause identified, a correction directed to a labeling model used in generating a corresponding first label.

6. The method of claim 5, wherein the labeling model corresponds to a heuristic labeling model associated with a threshold; and
the correction directed to the heuristic labeling model is to adjust the threshold of the heuristic labeling model.

7. The method of claim 1, wherein the first model is derived by:
obtaining a second group of data records from the training data, wherein the first and second groups of data records are disjoint;
performing supervised learning of the first model using the second group of data records based on the first labels of the data records in the second group; and
deriving the first model when the supervised learning converges.

8. A system for validating labels of training data, comprising:
at least one processor configured to receive a first group of data records associated with the training data, wherein each of the first group of data records includes a vector having at least one feature and a first label determined via a heuristic model;
for each of the first group of data records,
determine a second label based on the at least one feature in accordance with a first model different from the heuristic model and obtained via training based on the data records;
in the event that the first label does not match the second label, obtain a loss indicating a degree of mismatch between the first label and the second label; and
classify the data record as having an incorrect first label when the loss meets a pre-determined criterion; and
generate a sub-group of the first group of data records, each of which has the incorrect first label.

9. The system of claim 8, wherein the loss is determined based on a discrepancy between the first label and the second label.

10. The system of claim 8, wherein the at least one processor is further configured to:
correct, for each of the sub-group of data records, the associated first label based on the corresponding second label.

11. The system of claim 8, wherein the at least one processor is further configured to:
cluster the sub-group of data records into one or more clusters; and
identify, with respect to each of the one or more clusters, a cause that leads to the incorrect first labels.

12. The system of claim 11, wherein the at least one processor is further configured to:
determine, for at least some cause identified, a correction directed to a labeling model used in generating a corresponding first label.

13. The system of claim 12, wherein
the labeling model corresponds to a heuristic labeling model associated with a threshold; and
the correction directed to the heuristic labeling model is to adjust the threshold of the heuristic labeling model.

14. The system of claim 8, wherein the at least one processor is further configured to:
obtain a second group of data records from the training data, wherein the first and second groups of data records are disjoint;
perform supervised learning of the first model using the second group of data records based on the first labels of the data records in the second group; and
derive the first model when the supervised learning converges.

15. A non-transitory computer readable medium including computer executable instructions, wherein the instructions, when executed by a computer, cause the computer to perform a method for validating labels of training data, the method comprising:
receiving a first group of data records associated with the training data, wherein each of the first group of data records includes a vector having at least one feature and a first label determined via a heuristic model;
for each of the first group of data records,
determining a second label based on the at least one feature in accordance with a first model different from the heuristic model and obtained via training based on the data records;
in the event that the first label does not match the second label, obtaining a loss indicating a degree of mismatch between the first label and the second label; and
classifying the data record as having an incorrect first label when the loss meets a pre-determined criterion; and
generating a sub-group of the first group of data records, each of which has the incorrect first label.

16. The non-transitory computer readable medium of claim 15, wherein the loss is determined based on a discrepancy between the first label and the second label.

17. The non-transitory computer readable medium of claim 15, the method further comprising:
correcting, for each of the sub-group of data records, the associated first label based on the corresponding second label.

18. The non-transitory computer readable medium of claim 15, the method further comprising:
clustering the sub-group of data records into one or more clusters; and
identifying, with respect to each of the one or more clusters, a cause that leads to the incorrect first labels.

19. The non-transitory computer readable medium of claim 18, the method further comprising:
determining, for at least some cause identified, a correction directed to a labeling model used in generating a corresponding first label.

20. The non-transitory computer readable medium of claim 19, wherein
   the labeling model corresponds to a heuristic labeling model associated with a threshold; and
   the correction directed to the heuristic labeling model is to adjust the threshold of the heuristic labeling model.

\* \* \* \* \*